(12) United States Patent
Miklosovic et al.

(10) Patent No.: US 11,152,869 B2
(45) Date of Patent: Oct. 19, 2021

(54) POWER CONVERTER CONTROL SYSTEM OBSERVER (71) Applicant: ROCKWELL AUTOMATION TECHNOLOGIES, INC., Mayfield Heights, OH (US)

(72) Inventors: Robert J. Miklosovic, Chardon, OH (US); Ahmed Mohamed Sayed Ahmed, Mequon, WI (US)

(73) Assignee: Rockwell Automation Technologies, Inc., Mayfield Heights, OH (US)

(*) Notice: Subject to any disclaimer, the term of this patent is extended or adjusted under 35 U.S.C. 154(b) by 8 days.

(21) Appl. No.: 16/834,719

(22) Filed: Mar. 30, 2020

(65) Prior Publication Data
US 2020/0228024 A1 Jul. 16, 2020

Related U.S. Application Data (63) Continuation of application No. 16/234,155, filed on Dec. 27, 2018, now Pat. No. 10,615,705.

(51) Int. Cl.
*H02M 5/458* (2006.01)
*H02P 27/06* (2006.01)
*H02M 1/12* (2006.01)
*H02M 1/08* (2006.01)
*H02M 3/02* (2006.01)
*H02M 1/00* (2006.01)

(52) U.S. Cl.
CPC .......... *H02M 5/4585* (2013.01); *H02P 27/06* (2013.01); *H02M 1/0025* (2021.05); *H02M 1/08* (2013.01); *H02M 1/126* (2013.01); *H02M 3/02* (2013.01)

(58) Field of Classification Search
CPC .... H02M 5/4585; H02M 1/0025; H02M 1/08; H02M 3/02; H02M 1/126; H02M 1/4233; H02M 1/008; H02M 1/4216; H02P 27/06; H02P 2201/03; Y02B 70/10
See application file for complete search history.

(56) References Cited

U.S. PATENT DOCUMENTS

| 9,651,592 B2 | 5/2017 | Kerkman et al. |
| 9,960,723 B2 | 5/2018 | Zhang et al. |
| 2003/0201747 A1 | 10/2003 | Chaffee |

(Continued)

OTHER PUBLICATIONS

Communication pursuant to Article 94(3) EPC for Application No. 19218777.1 dated Mar. 10, 2021, 6 pages.

(Continued)

*Primary Examiner* — Kyle J Moody
(74) *Attorney, Agent, or Firm* — Fletcher Yoder, P.C.

(57) ABSTRACT

A system may include a power converter and a control system communicatively coupled to the power converter. The control system may determine a first DC voltage associated with the DC bus based on one or more DC external capacitance values that correspond to one or more loads coupled to the power converter. The control system may also determine a second DC voltage associated with the DC bus based on a capacitance of a system in which the power converter operates. The control system may also determine a third DC voltage associated with the DC bus based on the first DC voltage and the second DC voltage and adjust an operation of the power converter based on the third DC voltage.

20 Claims, 6 Drawing Sheets (56) References Cited

U.S. PATENT DOCUMENTS

2014/0340054 A1 11/2014 Lemberg et al.
2021/0135589 A1* 5/2021 Mohamed Sayed Ahmed ............
                                              H02J 7/345

OTHER PUBLICATIONS

Extended European Search Report for Application No. 19218777.1 dated Jun. 3, 2020, 9 pages.
Perez et al; "Predictive control of DC-link voltage in an active-front-end rectifier, Industrial Electronics (ISIE);" 2011 IEEE International Symposium On; IEEE; Jun. 27, 2011; 6 pages.
Liu et al; "A Simplified Direct Finite-Control-Set Model Predictive Control for AFEs with DC-Link Voltage Dynamic Reference Design," 2016 35th Chinese Control Conference (CCC); Jul. 27, 2016; 6 pages.

* cited by examiner

POWER CONVERTER CONTROL SYSTEM OBSERVER

CROSS REFERENCE TO RELATED APPLICATIONS

This application is a continuation of and claims priority to and the benefit of United States (U.S.) application Ser. No. 16/234,155, entitled "Power Converter Control System Observer," filed Dec. 27, 2018, which is herein incorporated by reference in its entirety for all purposes.

BACKGROUND

This disclosure relates generally to systems and methods for regulating operational parameters of device power converter. More specifically, the present disclosure discusses controlling the operational parameters of a motor drive active front end (AFE) device based on the actual and estimated output of the direct current (DC) bus voltage.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

An industrial plant system is managed and operated using a control and monitoring system. To effectively control the industrial plant system, the control and monitoring system may receive real-time data related to the operation or output of a motor drive power converter that is part of the industrial plant system to control an operation of one or more devices within the industrial plant system. In some cases, the real-time data may not provide sufficient insight with regard to how to control the operation of the motor drive power converter. As such, improved systems and methods for controlling the operation of the motor drive power converter are desirable.

BRIEF DESCRIPTION

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a system may include a power converter that converts a first voltage to a second voltage on a direct current (DC) bus based on an operational parameter of the power converter. The system may also include a control system communicatively coupled to the power converter. The control system determine a first DC voltage associated with the DC bus based on one or more DC external capacitance values that correspond to one or more loads coupled to the power converter. The control system may also determine a second DC voltage associated with the DC bus based on a capacitance of a system in which the power converter operates. The control system may also determine a third DC voltage associated with the DC bus based on the first DC voltage and the second DC voltage and adjust an operation of the power converter based on the third DC voltage.

In another embodiment, a method may include determining a first DC voltage associated with a DC bus based on one or more DC external capacitance values. The DC external capacitance values may correspond to one or more loads coupled to an active front end (AFE) device that converts a first voltage to a second voltage on the DC bus. The method may also include determining a second DC voltage associated with the DC bus based on a capacitance of a system in which the AFE device operates and determining a third DC voltage associated with the DC bus based on the first DC voltage and the second DC voltage. The method may also include adjusting an operation of the AFE device based on the third DC voltage.

In yet another embodiment, a tangible, non-transitory, and machine-readable medium, that includes machine-readable instructions stored thereon that when executed may cause a processor to determine a first DC voltage associated with a DC bus based on one or more DC external capacitance values. The DC external capacitance values may correspond to one or more loads coupled to an active front end (AFE) device that converts voltage first voltage to a second voltage on the DC bus. The instructions may also cause a processor to determine a second DC voltage associated with the DC bus based on a capacitance of a system in which the AFE device operates and determine a third DC voltage associated with the DC bus based on the first DC voltage and the second DC voltage. The instructions may also cause a processor to adjust an operation of the AFE device based on the third DC voltage.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The present disclosure is generally directed toward techniques for improving the operation of an industrial plant system, and specifically to using an active front end (AFE) control system coupled to an AFE device to better control the operation of the industrial plant system (e.g., plant system). For examine, the AFE control system may include one or models to predict responses of the industrial plant system to one or more inputs (e.g., operational parameters or operational set-points). The one or more models may leverage parameter values representative of various aspects of the industrial plant system to predict the response of the industrial plant system to the one or more inputs. One example of a model used by the control and monitoring system includes an industrial plant (e.g., system) model that may be modeled based on one or more system parameters. A system parameter may be associated with the industrial plant system, an operation of the industrial plant system, with the particular component being modeled, or the like. For example, the system parameters used in the AFE device model may include a system capacitance. The total system capacitance may include an internal capacitance of an industrial plant (Cint) and a direct current (DC) external capacitance (Cext) of one or more loads electrically coupled to the AFE device, or the like. It is noted that as used herein, one or more loads electrically coupled to the AFE device refers to loads coupled to the AFE device through a DC bus, such as an inverter coupled to a motor drawing power from the DC bus coupling the AFE device to the inverter. Since the models used by the control and monitoring system are integral to determining and modifying operation of the industrial plant system, it may be desired for the model to use accurate system parameter values that suitably model expected behavior of components of the industrial plant system. For example, when modeling the AFE device, the system parameters used in the model are desired to be accurate and actually representative of the response of the AFE device to inputs.

This may be problematic since measuring the DC external capacitance of the one or more loads of the AFE device is challenging and susceptible to error. Moreover, the DC external capacitance system parameter may change when loads are powered-off, powered-on, driven differently, are used to drive different motor loads, or the like. To define it differently, the DC external capacitance system parameter may change often, rapidly, and so forth in response to a change in operation of a load of the AFE device. This may make suitable updating of the DC external capacitance system parameter within the model of the AFE device challenging leading to an inaccurately captured value being used in the model of the AFE device. When the DC external capacitance is inaccurately captured and use to model the AFE device, control operations determined by the control and monitoring system may also be invalid or produce undesirable (e.g., unexpected) results.

With the foregoing in mind, a control and monitoring system of the industrial plant system (e.g., that includes the AFE control system), may use one or more system parameters, such as an internal capacitance of an industrial plant (Cint), a DC external capacitance (Cext) of one or more loads electrically coupled to the AFE device, or the like, in determining operational parameters (e.g., switching frequency, voltage output, or the like) for an active front end (AFE) device to accommodate different loads that may be present in the industrial plant system. In some cases, the AFE control system relies on an operator to regularly update the one or more system parameters that the AFE control system uses to determine the operational parameters for the AFE device. In particular, the AFE control system relies on the operator updating the DC external capacitance value of the one or more loads electrically coupled to the AFE device through a direct current voltage (DC) bus in an AFE device model used by the AFE control system to determine the operational parameters for the AFE device. However, if the system parameters are updated with incorrect or inaccurate values, the AFE device may not operate according to operational parameters that accommodate for the one or more loads currently present on the industrial system. In this way, the quality of the control model may thus be based on the quality (e.g., correctness) of the DC external capacitance value used in the control model. Therefore, it is desired to have a correct and suitable DC external capacitance value associated with the control model.

In certain embodiments, the AFE control system may use correction factors for a non-ideal plant model and an ideal plant model to more accurately predict the DC bus voltage in real-time with respect to the various loads present on the AFE device. Correction factors represent a correction to an output based on one or more determined errors, such as an error between a set point and a measured process variable (or estimated process variable). In this way, the AFE control system may modify operational parameters of the AFE device based on a difference between a correction factor determined using a DC bus voltage resulting from a non-ideal plant model and a correction factor determined using a DC bus voltage estimate resulting from an ideal plant model. This permits the AFE control system to determine operational parameters for the AFE device based at least in part on a difference in performance of the non-ideal plant model and an ideal plant model regardless of an actual DC external capacitance value. Indeed, the effect of the actual DC external capacitance value may be incorporated into the calculations for operational control based on the difference in performance of the non-ideal plant model and an ideal plant model, thereby permitting the DC external capacitance value of the system capacitance to be ignored or otherwise set to zero for the purposes of determining an adjustment to make to the AFE device. As a result, the AFE control system may not rely on the operator updating the DC external capacitance value at various intervals and may rely on the internal capacitance of the industrial plant when determining control adjustments (e.g., as if Cext=0).

In other words, the system capacitance for the industrial plant or industrial system generally include both the internal capacitance of an industrial plant (Cint) and the direct current (DC) and external capacitance (Cext), which are both known and accurate (e.g., within 1-5%). By using the techniques described herein, the AFE control system or other suitable control system may assume to know the internal capacitance of an industrial plant (Cint), while setting the DC external capacitance (Cext) to 0. The DC external capacitance (Cext) is assumed to be 0 partially because is it usually unknown, but also because this unintuitive critical setting allows an observer component of the control system enough operating space (e.g., margin) to estimate and cancel the effects of the DC external capacitance (Cext) indirectly through feedback related to a difference between an expected or ideal DC voltage output by the power converter without considering the DC external capacitance (Cext) and an measured DC voltage output by the power converter that is influenced by both the internal and DC external capacitances. Since the ideal DC voltage output assumes that the DC external capacitance does not exist, the control system may then tune (e.g., configure) a bus voltage regulator and the observer component based on the internal capacitance (Cint), as if the DC external capacitance (Cext) is 0.

Accordingly, the presently disclosed techniques facilitate the AFE control system in controlling the operational parameters of the AFE device. Through the controlling of the operational parameters, the AFE device may compensate for a variety of system parameters deviations between an ideal plant model and the non-ideal plant model that may affect the AFE device response to operational parameters. For example, the techniques described herein facilitate the AFE control system in controlling the operational parameters of the AFE device regardless of actual values of resonance, line inductances, or the like, in addition to the DC external capacitance value.

Figure 1:
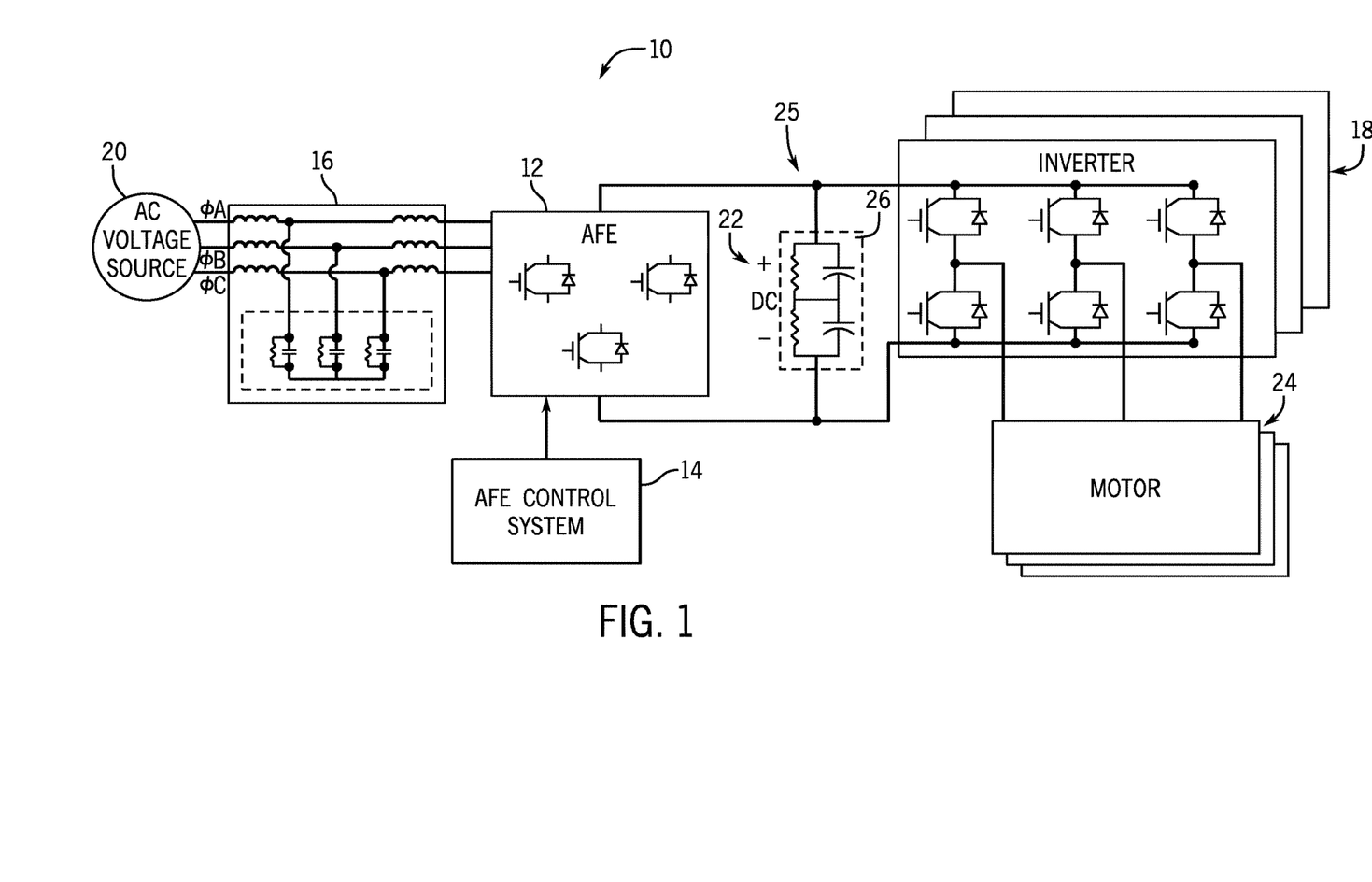
FIG. 1 is a block diagram of an active front end direct current rectifier (AFE) and an AFE control system associated with an industrial plant system, in accordance with an embodiment.

By way of introduction, FIG. 1 is a block diagram of a motor-drive system 10, which may be part of an industrial plant system. The motor-drive system 10 may include an active front end (AFE) device 12 and an AFE control system 14 that may control the operation of the AFE device 12. As shown, the motor-drive system 10 may also include an inductor-capacitor-inductor (LCL) filter 16 and one or more inverters 18. The LCL filter 16 may filter the input alternating current (AC) voltage provided to the AFE device 12, while the inverters 18 may convert the DC voltage output by the AFE device 12 into a controllable AC voltage, as will be discussed below. In one embodiment, the LCL filter 16 may be positioned between the voltage source 20 and the AFE device 12 to reduce input harmonics that may have been caused by power conversion devices (e.g., thyristors, insulated-gate bipolar transistor (IGBT), diodes) switching in the AFE device 12.

In general, the AFE device 12 may receive three-phase alternating current (AC) voltage from a voltage source 20 or a direct current (DC) voltage from the voltage source 20 and convert the AC voltage or DC voltage into a direct current (DC) voltage 22 suitable for powering a load. As such, the AFE device 12 supplies a load, such as the one or more inverters 18, a DC voltage 22. In certain embodiments, the one or more inverters 18 then convert the DC voltage 22 to an AC voltage to be supplied to one or more devices connected to the inverters 18, such as motors 24. The one or more inverters 18 may then, in turn, control the speed, torque, or other suitable operation of the one or more motors 24 by controlling the AC voltage provided to the motors 24. It should be understood that the industrial plant system may include one or more motor-drive systems 10, and each of the motor-drive systems 10 may include one or more additional components not depicted in FIG. 1.

The AFE device 12 may include any suitable rectifier device that includes a number of switches that may be controlled. That is, the switches of the AFE device 12 may be semiconductor-controlled devices, transistor-based (e.g., IGBT, metal-oxide semiconductor field-effect transistor (MOSFET), or other suitable transistor) devices, or other suitable devices in which the opening and/or closing of the switch may be controlled using an external signal (e.g., gate signal), which may be provided by the AFE controls system 14. The AFE device 12 may provide the DC voltage 22 (e.g., a regulated DC output voltage) on a direct current (DC) bus 25, which may be provided to the inverters 18 and may regenerate extra or additional power back to the voltage source 20. In this way, the AFE device 12 may operate to maintain a unity power factor, generate a stable DC voltage (e.g., DC voltage 22) from the voltage source 20, control a power factor transmitted to the one or more inverters 18, or the like to generally control power supplied to the one or more inverters 18.

As discussed above, the AFE device 12 may use the switching frequencies of the switches (e.g., power conversion devices) to convert the voltage from the voltage source 20 into the DC voltage 22. The DC voltage 22 may be generated across a resistor-capacitor (RC) circuit 26 including one or more resistors and one or more capacitors.

Although multiple inverters 18 may be coupled in parallel to the DC voltage 22, the multiple inverters 18 and the AFE device 12 may not, in some embodiments, include any communication or feedback channel between each other. In the same manner, the AFE control system 14 may not, in some embodiments, receive data from sensors or other components disposed on or associated with the inverters 18. For example, an increase in load may be applied to a shaft of one of the motors 24. In turn, the corresponding inverter 18 may compensate for the additional load by increasing power drawn from the DC bus to maintain certain operational characteristics (e.g., speed, torque) of the respective motor 24. As a result, the DC voltage 22 on the DC bus may drop lower than some threshold. To enable the remaining motors 24 and/or inverters 18 to operate within a certain operating parameters, the DC voltage 22 should be increased above the threshold. As such, as discussed above, an operator may input the current DC voltage 22 into the AFE control system 14, such that the AFE control system 14 may adjust the operations of the switches in the AFE device 12 to cause the DC voltage 22 to increase and compensate for the increased amount of power used by one of the inverters 18. This example of regulating operations is dependent on an operator recognizing that the DC voltage 22 has decreased due to an increase in load or power demand by one of the motors 24. If the input to the AFE control system 14 was not tuned or adjusted, the AFE control system 14 may not enable the AFE device 12 to efficiently provide power (e.g., DC voltage 22) for the inverters 18 to use during various loads.

As such, the regulation and regeneration operations of the AFE device 12 may depend on effective tuning of the AFE control system 14. In some embodiments, tuning of the AFE control system 14 may involve a DC external capacitance of the motor-drive system 10. The DC external capacitance value may correspond to a total internal capacitance associated with all loads coupled to the DC bus 25, where loads are considered loads of the AFE device 12 and may include the inverters 18 and the motors 24. As such, the DC external capacitance value may vary within a range of values as different loads (e.g., variable frequency drives, DC power supplies, DC micro-grid systems, or the like) are connected or disconnected from the DC bus 25 associated with the AFE device 12, or as operation of the loads change. To elaborate, as loads are connected or disconnected from the DC bus 25, the DC external capacitance value changes in response to changes in the motor-drive system 10.

As the DC external capacitance value changes, the operator should update or adjust the DC external capacitance value used by the AFE control system 14 to determine the appropriate DC voltage 22 to output onto the DC bus 25. However, it may be difficult to determine the DC external capacitance value at various times during the operation of the motor-drive system 10 because the calculation for the DC external capacitance value may involve using the internal capacitance of each load connected to the DC bus 25. As such, the operator may input a best guess or roughly estimated DC external capacitance value that the AFE control system 14 may use to control the operation of the AFE device 12 in light of the various load conditions coupled to the DC bus 25. As may be appreciated, the accuracy of the DC external capacitance value may directly affect performance of the motor-drive system 10. That is, the motor-drive system 10 may operate with a leading or lagging power factor that create power harmonics within the motor-drive system 10 that wear down various electrical components. Moreover, the motor-drive system 10 may consume power inefficiently, thereby drawing excess power to perform its operations. In addition, the AFE control system 14 may control the operation of the AFE device 12 to compensate for resonance and/or unknown line impedances.

With the foregoing in mind, the AFE control system 14 may tune the operation of the AFE device 12 using an observer component. The observer component may enable the AFE control system 14 to predictively respond to operational changes rather than performing reactionary operations. That is, by estimating the load current of the motor-drive system 10, the observer component may predict the external DC capacitance value, which may be provided to the AFE control system 14 to cancel out the effects of the external DC capacitance value in the calculations used by the AFE control system 14 to operate the AFE device 12. Additional details with regard to the operations between the observer component and the AFE control system 14 will be discussed in greater detail below.

Figure 2:
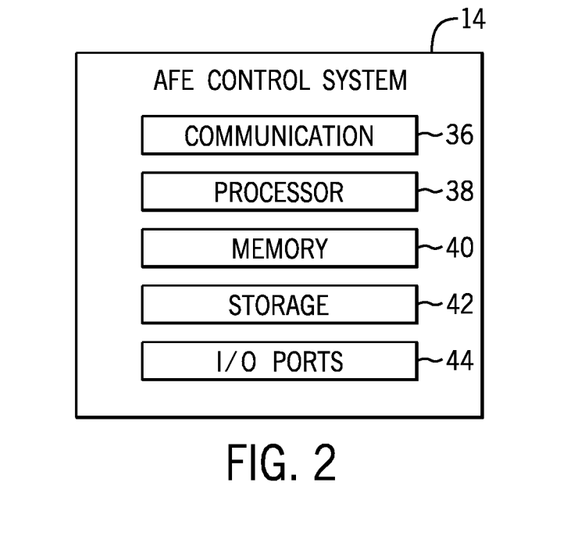
FIG. 2 is a block diagram of the AFE controller of FIG. 1, in accordance with an embodiment.

To help explain, FIG. 2 is a block diagram of components that may make up part of the AFE control system 14 of FIG. 1. The AFE control system 14 may include a communication component 36, a processor 38, a memory 40, a storage 42, input/output (I/O) ports 44, and the like. The communication component 36 may be a wireless or wired communication component that facilitates communication between the AFE control system 14, the AFE device 12, or any other suitable electronic device. The processor 38 may be any type of computer processor or microprocessor capable of executing computer-executable code. The memory 40 and the storage 42 may be any suitable articles of manufacture that may serve as media to store processor-executable code, data, or the like. These articles of manufacture may represent computer-readable media (i.e., any suitable form of memory or storage) that may store the processor-executable code used by the processor 38 to perform the presently disclosed techniques, such as to predictively response to operational changes, or the like.

The I/O ports 44 may couple to one or more sensors, one or more input devices, one or more displays, or the like to facilitate human or machine interaction with the AFE control system 14. For example, based on a notification provided to the operator via a display, the operator may use an input device to instruct the adjustment of a parameter associated with the AFE control system 14.

Figure 3:
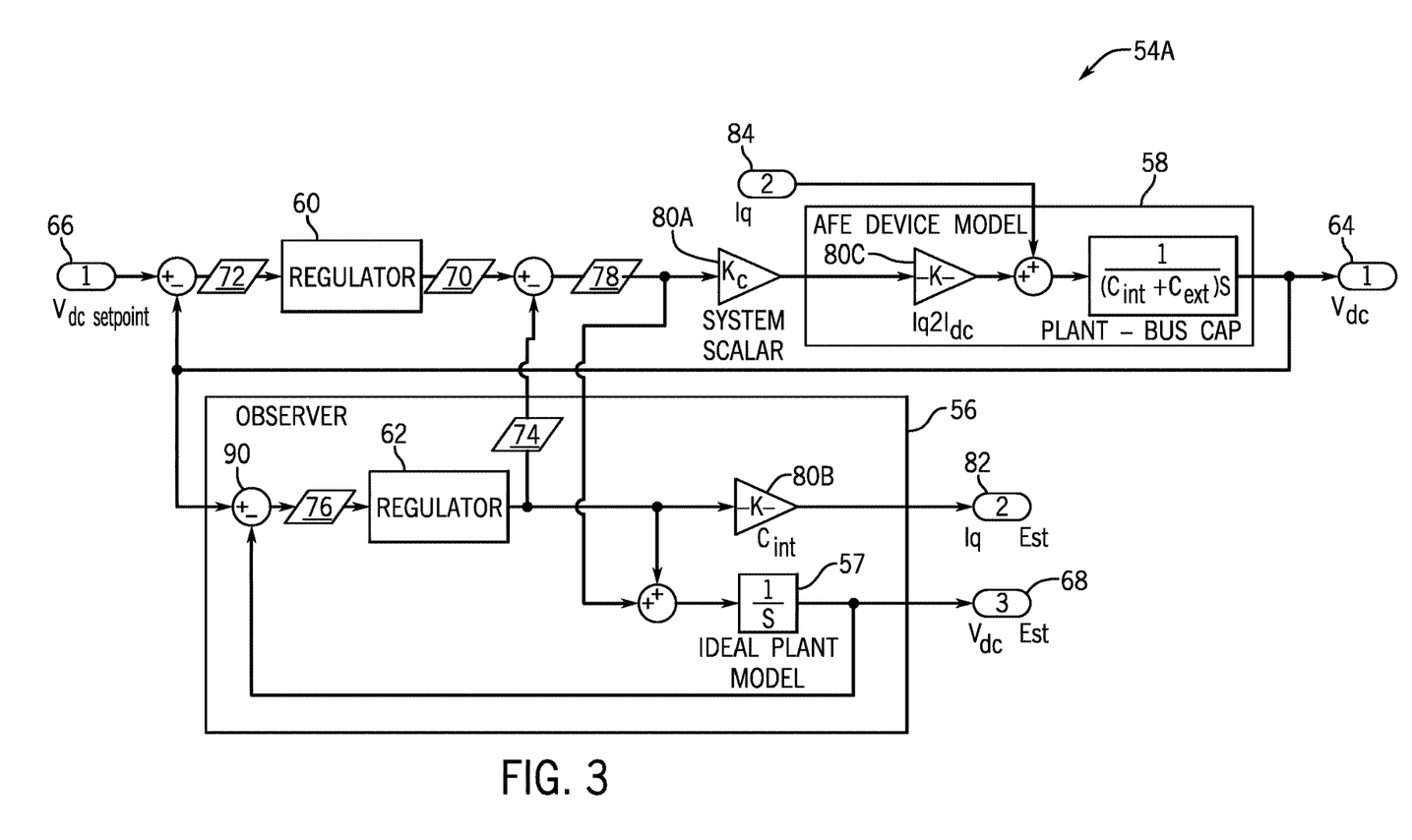
FIG. 3 is a control flow diagram associated with operations of the AFE controller of FIG. 1, in accordance with an embodiment.

To produce high performance tuning-less converter operation of the AFE device 12 by the AFE control system 14, FIG. 3 is a control flow diagram 54A that illustrates operations of the AFE control system 14 (e.g., processing operations, computational operations, modeling operations, or the like). Generally speaking, the AFE control system 14 may use various inputs, in conjunction with processing operations, to control the operational parameters of the AFE device 12.

Referring to FIG. 3, the AFE control system 14 may leverage an observer component 56, which may include an ideal plant model 57 (e.g., ideal system model of the system in which the AFE device 12 operates) modeling a DC bus (e.g., similar to DC bus 25) that has a DC external capacitance of 0 (e.g., no loads) and unity internal capacitance where Cint in the AFE model 58 is cancelled by its inverse in the gain 80A. The observer component 56 may be any suitable software or hardware component that models a response of the ideal AFE device model 57 to one or more system parameters associated with the AFE device 12. By basing control of the operational parameters of the AFE device 12 at least in part on simulated outputs from the ideal plant model 57, the AFE control system 14 is able to control the operational parameters of the AFE device 12 in a manner independent from the value of the DC external capacitance value.

With this in mind, the AFE control system 14 may employ three components to control the operational parameters of the AFE device 12. The AFE control system 14 may use an active front end (AFE) device model 58, a regulator 60, and the above-described observer component 56, which includes the ideal plant model 57 and a regulator 62, as the three components. The regulators 60, 62 may each receive a direct current (DC) bus voltage output 64 output from the AFE device model 58 and determine one or more correction factors based at least in part on the DC bus voltage output 64. The AFE device model 58 may predict a response of the AFE device 12 to a particular input based on system parameters associated with the AFE device 12. For example, the system parameters used in the AFE device model may include an internal capacitance of an industrial plant (Cint) without using a DC external capacitance (Cext) of one or more loads electrically coupled to the AFE device, or the like.

The DC bus voltage output 64 may be used by the AFE control system 14 to determine switching frequencies or operational control techniques to use in driving the AFE device 12 to output a DC bus voltage in accordance with the DC bus voltage output 64 and a direct current (DC) bus voltage set point 66 indicative of a desired operation of the AFE device 12, such as an ideal or desired DC bus voltage. In particular, the regulators 60, 62 may determine errors between the DC bus voltage output 64 and either the DC bus voltage set point 66 or a direct current (DC) bus voltage output estimate 68. That is, the DC bus voltage set point 66 may indicate a desired DC bus voltage output by the AFE device 12, and the current operation of the AFE device 12 may be modelled or compared against the desired DC bus voltage output to enable the AFE control system 14 to control operational parameters of the AFE device 12.

The regulator 60 may determine a correction factor 70 based at least in part on an error 72 determined by subtracting the DC bus voltage output 64 from the DC bus voltage set point 66. The regulator 62 may determine a correction factor 74 based at least in part on an error 76 determined by subtracting the DC bus voltage output estimate 68 from the DC bus voltage output 64. The DC bus voltage estimate 68 may correspond to a simulated response of the AFE device 12 to the correction factor 74 being applied to the ideal plant model 57 from a previous iteration. In this way, the correction factor 74 determined during a current iteration may rely on previous DC bus voltage estimates 68. It is noted that as used herein, the errors 72 and 76 may be determined at summation nodes, which may be any suitable processing technique to subtract or add one value (or signal) with another value (or signal). As depicted, this summation node includes a "+" and a "−", as is well known in the art, the "−" refers to this summation node being used as part of a negative feedback control loop. As is also depicted in FIG. 3, the combination of a "+" and "+" on a summation node (e.g., the summation node that receives the correction factor 74) may be used as part of a positive feedback control loop.

Upon receiving both the correction factor 70 and the correction factor 74, the AFE control system 14 may determine a correction factor 78 by subtracting the correction factor 74 from the correction factor 70 at a summation node. The correction factor 78 thus represents a final correction factor determined from the difference in correction factors 70, 74 between the ideal plant model 57 (e.g., not affected by the DC external capacitance) and the AFE device model 58 (e.g., affected by the DC external capacitance). In this way, the AFE control system 14 may control the operational parameters based on an updated DC bus voltage output 64 that changes based on the AFE device model 58 response to the newly inputted correction factor 78, which captures a difference in response between the AFE device model 58 (e.g., non-ideal model) and the ideal plant model 57 to a same DC bus voltage output, as well as difference between outputted correction factors 70, 74. In this way, the correction factor 78 may be used to adjust operation of the AFE device 12 in response to the differences in the responses due to a change in DC external capacitance from the ideal plant model 57 to the AFE device model 58 without directly calculating or determining the actual DC external capacitance value.

With the foregoing in mind, the AFE control system 14 may subtract out and determine errors between AFE device 12 behavior to an input and the ideal plant model 57 behavior to the input (e.g., a same input as the input). Determining the error between the actual and the ideal response may facilitate compensating and adjusting for a variety of differences between the actual plant system and the ideal plant system when the AFE control system 14 controls the operational parameters of the AFE device 12. An example of the differences include the above-described difference in DC external capacitance values, but these techniques may also compensate for any suitable difference that changes response between the AFE device model 58 and the ideal plant model 57, including different resonance values, line inductance values, or the like.

The AFE control system 14 may also employ one or more gains 80 (e.g., 80A, 80B, 80C) to further modify subsequent outputs (e.g., the correction factor 78, the correction factor 74) associated with determining response values, such as the DC bus voltage output 64, a load current estimate 82 (Iq Est). The load current estimate 82 is an estimated current value associated with an expected output from an ideal AFE device during an actual operation while a load current 84 (Iq) is the actual current value associated with an expected output from the AFE device 12 (e.g., a non-ideal AFE device) during actual operation. The load current estimate 82 and/or the load current 84 may be used at least in part to determine the DC bus voltage output 64. The load current estimate 82 can be used as a feedforward term to decouple the load effects and enhance the dynamic response of the system and/or for indication to the user. The load current 84 is an additive external load disturbance while the DC external capacitance (Cext) is a multiplicative external disturbance. The correction factor 74 may estimate both the load current 84 and the DC external capacitance, which is then fed back to generate the correction factor 78, thereby permitting a cancelation of the effects from external load disturbances and reduce the model overall to an ideal integrator. The load current estimate 82 is a scaled version of the correction factor 74 and may be used for measurement or sensing operations and/or as part of an external feedback loop. The load current estimate 82 may also be used or represented on a graphical user interface or electronic display. Although depicted as outputting the DC bus voltage output 64, it should be understood that the AFE control system 14 may actually output one or more control signals to control the operational parameters of the AFE device 12 (e.g., based at least in part on the DC bus voltage output 64) to cause the AFE device 12 to output a voltage equal to the DC bus voltage output 64.

In the described operations, various system parameters are unknown, such as the DC external capacitance value used in the AFE device model 58. Sometimes, the AFE control system 14 receives these values as an input from the operator. However, as also described above, this may lead to the introduction of error into control operations, such as from the operator entering an unsuitable value for the DC external capacitance value (Cext). Operating the AFE control system 14 to perform control operations as depicted in FIG. 3 may eliminate a reliance on an actual (e.g., estimated) DC external capacitance value by controlling operations while automatically compensates for the DC external capacitance (Cext), as well as other variable system parameters. That is, unlike conventional systems for controlling the DC bus voltage, the AFE control system 14 sets the DC external capacitance (Cext) to 0 to be able to estimate it and cancel its effects with regard to the operation of the AFE device 12.

This feedback technique described above enables the AFE control system 14 to control the operational parameters in such a manner to cause the AFE device 12 to operate relative to the ideal plant model 57. As a result, tuning-less operation may be permitted and may no longer rely on preliminary auto-tune or bump tests to determine system parameters (e.g., DC external capacitance value, resonance values, line inductance values, or the like) and/or current loop scaling. Thus, the DC external capacitance may be ignored in the system capacitance and set to a zero value or zero (e.g., Cext=0).

The regulator 60 and the regulator 62 may both include a separate control system to maintain operation of an associated component (e.g., ideal plant system, actual plant system) around a static level or point under disturbances irrespective of the initial condition. In some embodiments, the regulator 60 and/or the regulator 62 may use one or more proportions (e.g., Proportional Integral (PI) regulator) when maintaining operation of the component. For example, the regulator 60 and the regulator 62 may each respectively use internal parameters to provide the separate control systems. In some embodiments, the regulator 62 (e.g., therefore the observer component 56) has a proportional gain (Kop) equal to an inverted converter model time constant (CMTC) (e.g., Kop=1/CMTC). When Kop=1/CMTC, the integral bandwidth (Koi), the regulator 60 proportional gain (Kbp), and the regulator 60 integral gain (Kbi) of the observer component 56 may be defined as follows:

$$Koi = Kop2/4\zeta 2 \qquad [1]$$

$$Kbp = Kop/4\zeta 2 \qquad [2]$$

$$Kbi = Kbp2/4\zeta 2 \qquad [3]$$

In this way, the CMTC may be a lumped model time constant for the current loop of the AFE 12. The CMTC may be calculated as a sum of a time constant for the current loop, a feedback sample period, a calculation delay, and any time constant associated with feedback filtering. Each of the above-described tuning parameters (e.g., Kbi, Koi, Kbp, and Kbi) may be functions of the CMTC value and the damping factor may equal one ($\zeta=1$).

It should be noted that the example provided above with equations [1]-[3] is a specific example indicative of one manner in which the presently disclosed techniques may be put into practice. As shown above, when the plant internal capacitance (Cint) is cancelled by its inverse with the gain 80A (e.g., Kc), the DC external capacitance (Cext) may be compensated for by correction factor 74, thereby reducing the AFE device model 58 to a single integrator. The AFE device model 58 may be controlled through the above-described cascaded PI loops with bandwidths that are spaced $4\zeta^2$ apart.

Continuing in the discussion about the regulators 60, 62, the regulator 60 may each model a unity gain system and may use the additional gains 80, such as system gains 80A and 80C (e.g., scalar values) to determine an estimated output from a non-unity gain 80B system. Similarly, the regulator 62 may also model a unity gain system and use the gain to determine complete responses of the ideal plant model 57 to a particular input. In this way, environmental or operational differences associated with the AFE control system 14 or the observer component 56 may be compensated and negated through the separate control systems of the regulator 60 and the regulator 62.

As noted above, several processing components are represented as the gains 80. As described above, the AFE device model 58 includes a known plant internal capacitance (Cint) value and an unknown time-varying DC external capacitance (Cext) assumed to equal zero. The ideal AFE device model 58 behaves like a single integrator after applying the gain 80A and after the DC external capacitance (Cext) is estimated and cancelled. The values for each of the gains 80 may be programmed and/or determined to be same or different values. The gain 80A is considered a system gain value that depends on the on initially known/estimated capacitance of the system. The gain 80C is the simplified equivalent gain of the AFE device 12 or any suitable power converter these techniques are being applied to. The gain 80B depends on the initially know/estimated capacitance. The gain 80A may be determined and applied in such a manner as to cancel other gains permitting the plant system to be modelled as a unity gain system (e.g., gain of 1). In other words, the gain 80A and the observer 56 cause the AFE control system 54A to behave like an ideal plant model 57.

Figure 4:
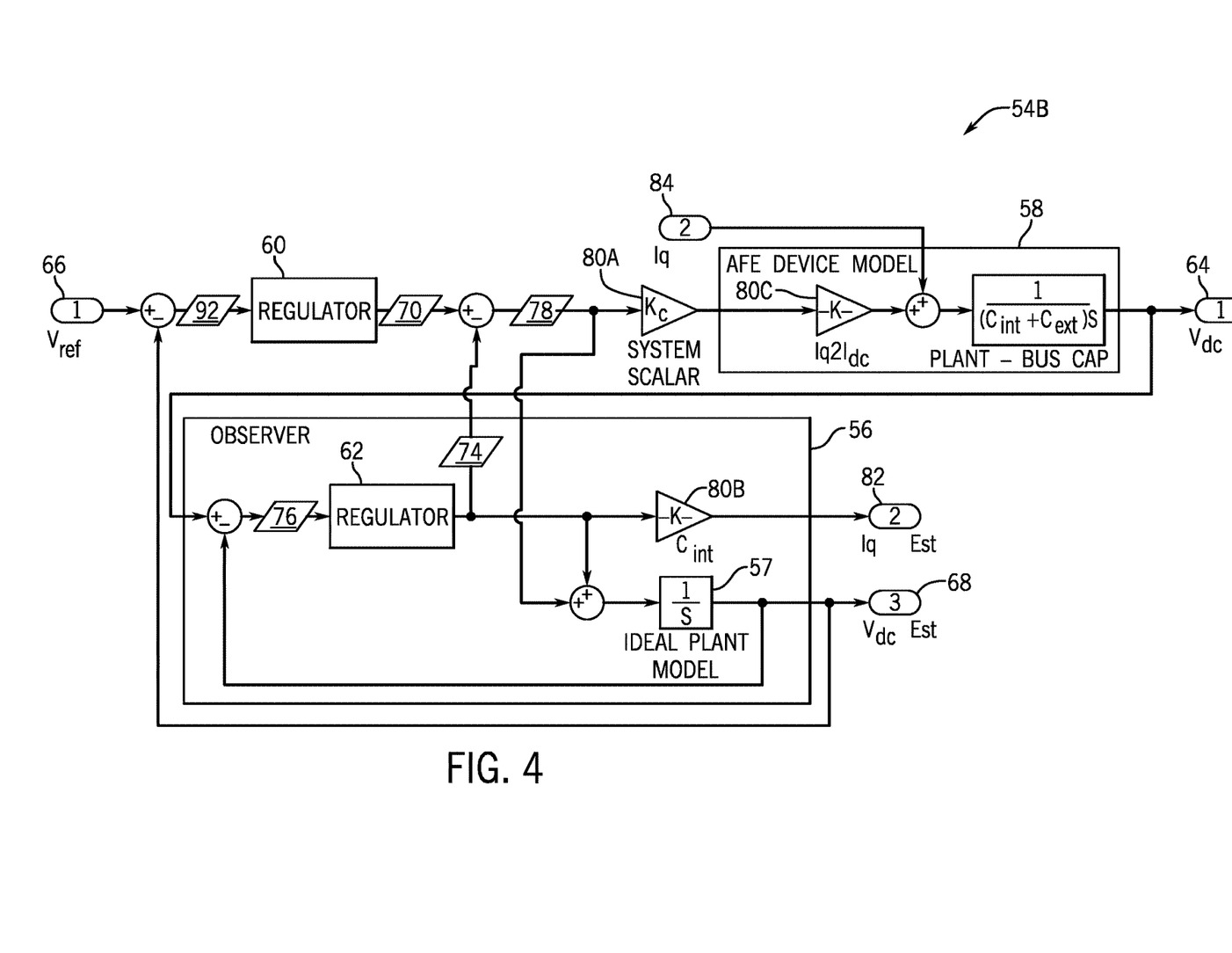
FIG. 4 is another control flow diagram associated with another example of operations of the AFE controller of FIG. 1, in accordance with an embodiment.

FIG. 4 is another control flow diagram 54B that depicts an embodiment of the control flow diagram 54A and operates similarly to the control flow diagram 54A. However, instead of the measured DC bus voltage 64 being compared to the DC bus voltage estimate 68, in this depicted embodiment, the DC bus voltage estimate 68 is subtracted from the DC bus voltage set point 66, as opposed to the measured DC bus voltage output 64. For ease of discussion, descriptions included earlier for components substantially similar between FIG. 3 and FIG. 4 are relied upon herein.

In this depicted example, the regulator 60 receives an error 92 from a summation node that subtracts the DC bus voltage output estimate 68 from the DC bus voltage set point 66 (instead of subtracting the DC bus voltage output 64 from the DC bus voltage set point 66, as described in FIG. 3). The error 92 thus represents a difference between an estimated voltage output from the ideal plant model 57 (e.g., DC bus voltage output estimate 68) and a set point value (e.g., DC bus voltage set point 66). Using this error 92, the regulator 60 determines the correction factor 70 based at least in part on how the AFE control system 14 is to control the operational parameters of the AFE device 12 to correct for the error between the output of the ideal plant model 57 and the set point. In addition, the regulator 62 receives the error 76 from the summation node that subtracts the DC bus voltage output estimate 68 from the DC bus voltage output 64, as described in FIG. 3.

These determined correction factors 70, 74 are compared against each other to determine the correction factor 78, similar to the AFE control system 14 operations described in FIG. 3. As described above, the correction factor 78 is processed and used by the AFE control system 14 to control the operational parameters of the AFE device 12. Using the DC bus voltage estimate 68 (instead of the measured DC bus voltage output 64) may enhance the dynamic performance of the AFE control system 14. Performance is enhanced by reducing a delay associated with the response time of the AFE control system 14 to changes in output from the AFE device 12. The response time is reduced based at least in part on making the operational parameter adjustments before the AFE control system 14 senses or receives indication of the DC bus voltage output 64 value. Since the AFE control system 14 is able to control the operational parameters of the AFE device 12 based on estimated outputs rather than actual outputs, an overall faster and more responsive AFE control system 14 may be implemented using processing techniques depicted in the example control flow diagram 54B.

Figure 5:
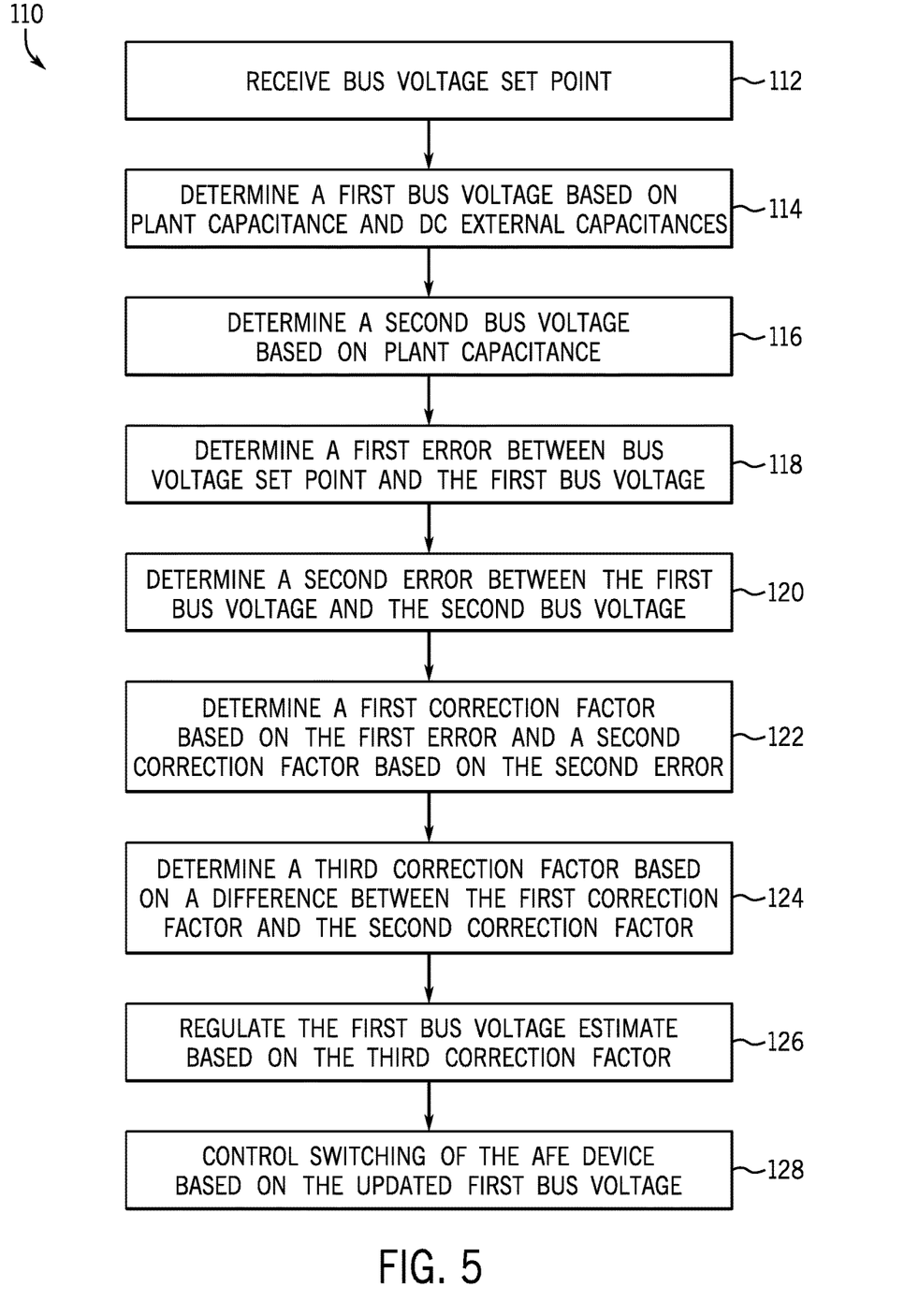
FIG. 5 is a flowchart corresponding to operations depicted in FIG. 3 and associated with the AFE controller of FIG. 1, in accordance with an embodiment.
Figure 6:
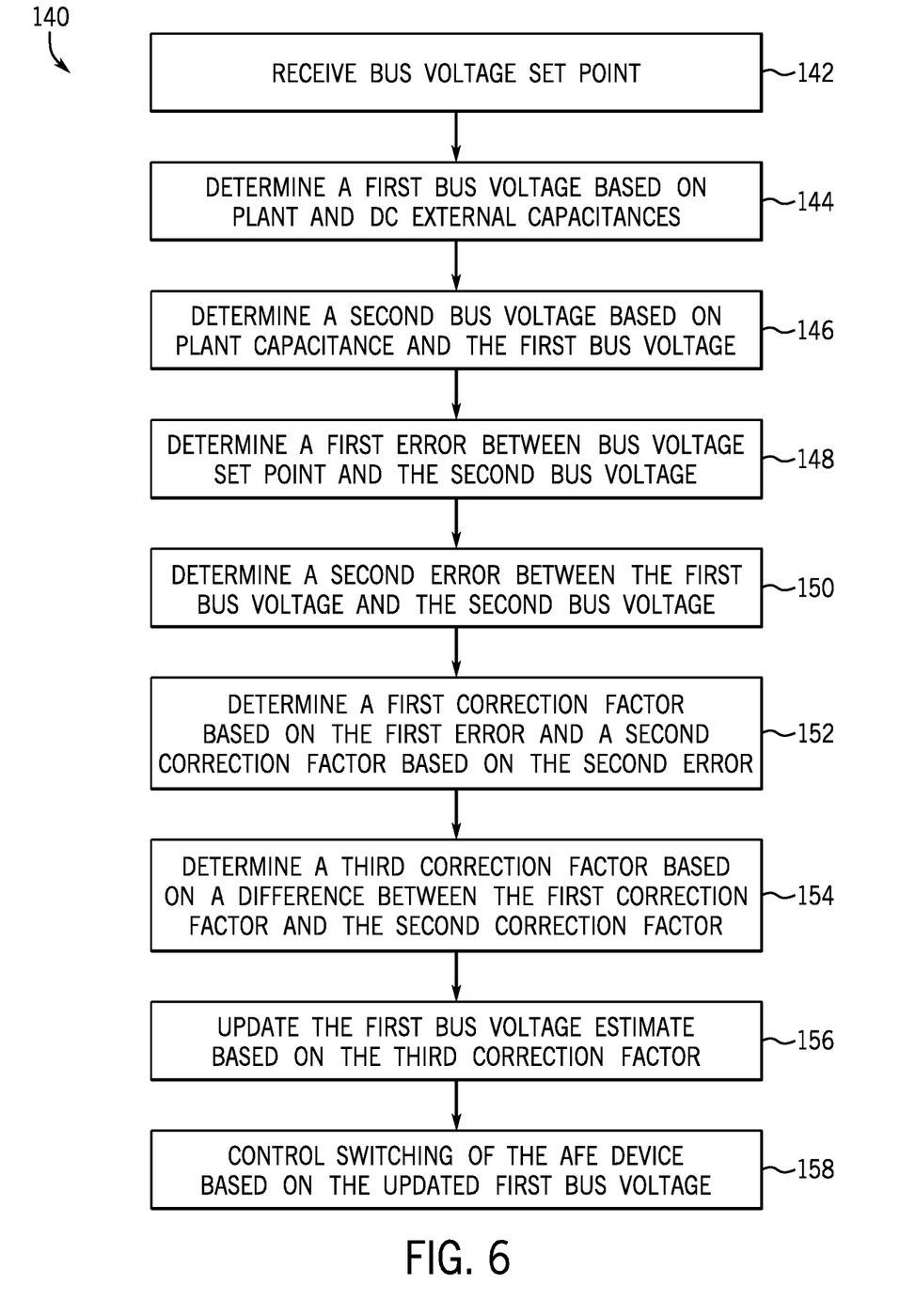
FIG. 6 is a flowchart corresponding to operations depicted in FIG. 4 and associated with the AFE controller of FIG. 1, in accordance with an embodiment.

The above-described control flow diagrams 54 may be synthesized into flowcharts shown in FIG. 5 and FIG. 6 depicting a generalized method to determine control operations to be used with the AFE device 12. For example, FIG. 5 is a flowchart of a method 110 performed by the AFE control system 14 to control the operational parameters of the AFE device 12 corresponding to the control flow diagram 54A.

Although the method 110 is described below as performed by the AFE control system 14, it should be noted that the method 110 may be performed by any suitable processor that controls operational parameters of the AFE device 12. Moreover, although the following description of the method 110 is described in a particular order, it should be noted that the method 110 may be performed in any suitable order.

As described above, the control flow diagram 54A is generalized with the method 110. For example, at block 112, the AFE control system 14 receives a bus voltage set point (e.g., DC bus voltage set point 66). The AFE control system 14 may determine, at block 114, a first bus voltage (e.g., DC bus voltage output 64) based on plant capacitances and DC external capacitances (e.g., non-ideal AFE device model 58). In this way, the first bus voltage may be a measured value inclusive of an influence of the plant capacitance and the DC external capacitance associated with each of the loads of the DC bus 25 and the operation of each of the loads.

At block 116, the AFE control system 14 may determine a second bus voltage (e.g., DC bus voltage output estimate 68) estimated based on the plant capacitance (e.g., ideal plant model 57). The second bus voltage thus represents an estimated ideal voltage output of the ideal plant model that may be inclusive of the influence of the plant capacitance and exclude influence of the DC external capacitance. At block 118, the AFE control system 14 may determine a first error (e.g., error 72) between the bus voltage set point (e.g., DC bus voltage set point 66) and the first bus voltage (e.g., DC bus voltage output 64). The first error includes the difference between the set point and the actual DC bus voltage output corresponding to influences from both the plant capacitance and the DC external capacitance. At block 120, the AFE control system 14 may determine a second error (e.g., error 76) between the first bus voltage (e.g., DC bus voltage output 64) and the second bus voltage (e.g., DC bus voltage output estimate 68). The second error includes the difference between the actual DC bus voltage output and the estimate DC bus voltage output which excludes the influence from the DC external capacitance and includes the influence from the plant capacitance. The differences between the first error and the second error may be used to determine correction factors for operating the AFE device 12.

For example, at block 122, the AFE control system 14 may determine a first correction factor (e.g., correction factor 70) based at least in part on the first error (e.g., error 72) and a second correction factor (e.g., correction factor 74) based at least in part on the second error (e.g., error 76). These two correction factors may then be used to determine a third correction factor (e.g., correction factor 78) at block 124. The third correction factor represents a difference between the first error and the second error, thus the third correction factor equals the second correction factor associated with the second error subtracted from the first correction factor associated with the first error. In this way, the third correction factor permits the AFE control system 14 to remove the effects of the difference between the first error and the second error from the determination of how to operate the AFE device 12.

At block 126, the AFE control system 14 regulates the first bus voltage (e.g., DC bus voltage output 64) based at least in part on the third correction factor therefore permitting the removal of the effects of the DC external capacitance (Cext). The AFE control system 14 does this using one or more models (e.g., AFE device model 58). After updating of the first bus voltage (e.g., DC bus voltage output 64), at block 128, the AFE control system 14 controls switching of the AFE device based at least in part on the updated first bus voltage (e.g., DC bus voltage output 64). In this way, the AFE control system 14 may iteratively negate (e.g., nullify, make moot) the influence of the DC external capacitance on the control system used by the AFE control system 14 since the AFE control system 14 is able to adjust operation of the AFE device 12 toward the DC bus voltage set point 66 without a reliance on the specific DC external capacitance value.

In a similar manner, the control flow diagram 54B may be synthesized and generalized in FIG. 6. FIG. 6 is a flowchart of a method 140 similar to the method 110 performed by the AFE control system 14 to control operational parameters of the AFE device 12 corresponding to the control flow diagram 54B, and thus based at least in part on a difference between an estimated voltage output from the ideal plant model 57 (e.g., DC bus voltage output estimate 68) and a set point value (e.g., DC bus voltage set point 66). Since the method 140 is similar to the method 110, descriptions included earlier for blocks substantially similar between FIG. 5 and FIG. 6 are relied upon herein. In addition, although the method 140 is described below as performed by the AFE control system 14, it should be noted that the method 140 may be performed by any suitable processor that controls operational parameters of the AFE device 12. Moreover, although the following description of the method 140 is described in a particular order, it should be noted that the method 140 may be performed in any suitable order.

As described above, the control flow diagram 54B may be generalized using the method 140. For example, at block 142, the AFE control system 14 receives a bus voltage set point (e.g., DC bus voltage set point 66), similar to the block 112. The AFE control system 14 may determine, at block 144, a first bus voltage (e.g., DC bus voltage output 64) based on plant capacitance and DC external capacitance (e.g., non-ideal AFE device model 58) and thus may represent measured influences on the voltage output from the plant capacitance and from the DC external capacitances. At block 146, the AFE control system 14 may determine a second bus voltage (e.g., DC bus voltage output estimate 68) estimated based at least in part on plant capacitance (e.g., ideal plant model 57) and the first bus voltage estimate (e.g., DC bus voltage output 64).

At block 148, the AFE control system 14 determines a first error (e.g., error 92) between the bus voltage set point (e.g., DC bus voltage set point 66) and the second bus voltage (e.g., DC bus voltage output estimate 68). The first error thus represents a difference between the desired bus voltage set point and the estimated output voltage from the ideal plant model 57, and is determined independent of DC external capacitance (Cext). At block 150, the AFE control system 14 determines a second error (e.g., error 76) between the first bus voltage (e.g., DC bus voltage output 64) and the second bus voltage (e.g., DC bus voltage output estimate 68). The second error may indicate a difference between the measured voltage output from the non-ideal AFE device model 58 and the estimated voltage output from the ideal plant model 57, and thus may indicate the portion of the estimated voltage output from the non-ideal AFE device model 58 (e.g., DC bus voltage output 64) caused by the DC external capacitance.

At block 152, the AFE control system 14 determines a first correction factor (e.g., correction factor 70) based on the first error (e.g., error 92) and a second correction factor (e.g., correction factor 74) based on the second error (e.g., error 76). Thus, the first correction factor represents a correction based on a difference between the ideal performance and the desired performance and the second correction factor represents a correction based on the difference between the ideal performance and the non-ideal performance. The first correction factor and the second correction factor, at block 154, may be used to determine a third correction factor (e.g., correction factor 78) that indicates a correction to the control of the AFE device 12 to adjust for differences between the ideal performance, the non-ideal performance, and the desired performance of the AFE device 12. At block 156, the AFE control system 14 measures the DC bus voltage (e.g., DC bus voltage output 64) based at least in part on the third correction factor (e.g., correction factor 78) and at block 158, the AFE control system 14 control switching of the AFE device 12 based on the updated first bus voltage (e.g., DC bus voltage output 64).

Technical effects of the present disclosure include techniques for using an AFE control system that compares estimated outputs from an ideal plant model to actual outputs from a non-ideal AFE device model to control one or more operational parameters of an AFE device independent of the actual values of system parameters associated with the non-ideal AFE device. The AFE control system may determine an error between an estimated output from the ideal AFE device model and an actual output from the non-ideal AFE device model, and use the error to determine a correction factor. The AFE control system may also determine an error between a set point of the AFE device for the output and the actual output from the non-ideal AFE device model, and may use the error to determine an additional correction factor. In general, the AFE control system may use a difference between the correction factors to determine a resulting error representing the differences between the non-ideal AFE device model and the ideal AFE device model. Although many of the examples described herein are discussed with respect to an AFE device, the presently disclosed techniques may be performed with any suitable power converter device.

Controlling the operational parameters of AFE device based on the difference between the correction factors permits tuning-less operation based on default parameters inputted into the models and eliminates a reliance on updated models (e.g., updated with new system parameter values in response to operation changes in the AFE device or the load of the AFE device). Controlling the operational parameters of the AFE device in the manner described above also enables more robust and generally improved operation of the AFE control system by permitting adjustments based at least in part on estimated outputs.

While only certain features of the presently disclosed embodiments have been illustrated and described herein, many modifications and changes will occur to those skilled in the art. It is, therefore, to be understood that the appended claims are intended to cover all such modifications and changes as fall within the true spirit of the embodiments described herein

The invention claimed is:

1. A system, comprising:
a power converter configured to convert a first voltage to a second voltage on a direct current (DC) bus, wherein the power converter is part of an industrial automation system for performing one or more industrial operations; and
a control system communicatively coupled to the power converter, wherein the control system is configured to:
receive a first signal from an ideal system model configured to model one or more expected outputs of the industrial automation system, wherein the first signal corresponds to an estimated output generated by the ideal system model in response to a setpoint input;
receive a second signal from a power converter model configured to model a non-ideal behavior of the power converter, wherein the second signal corresponds to an actual output generated by the power converter in response to the setpoint input;
determine a difference between the first signal and the second signal; and
transmit a control signal configured to adjust an operation of the power converter based on the difference.

2. The system of claim 1, wherein the one or more expected outputs of the industrial automation system correspond to outputs generated by the industrial automation system in response to the setpoint input when operating without influence from one or more additional capacitances added to the industrial automation system.

3. The system of claim 1, wherein the control system is configured to adjust the operation to compensate for one or more capacitances that cause the non-ideal behavior of the power converter.

4. The system of claim 1, wherein the first signal is representative of a first DC voltage, and wherein the second signal is representative of a second DC voltage.

5. The system of claim 4, wherein the control system is configured to determine a DC voltage based on the difference between the first DC voltage and the second DC voltage.

6. The system of claim 1, wherein the control system is configured to determine the difference as part of a measurement operation.

7. The system of claim 1, wherein the control system is configured to determine the difference based at least in part on a negative feedback loop.

8. The system of claim 1, wherein the difference corresponds to a deviation in the operation of the power converter relative to the ideal system model related to one or more capacitance values, one or more resonance values, one or more line inductance values, or any combination thereof, associated with the power converter.

9. A method, comprising:
receiving, by a processor, a first estimated output from an ideal system model configured to model one or more expected outputs of a system, wherein the first estimated output is generated by the ideal system model in response to a setpoint input;
receiving, by the processor, a second estimated output from a device model configured to model a non-ideal behavior of a device within the system, wherein the second estimated output corresponds to an actual output generated by the device in response to the setpoint input;
determining, by the processor, a difference between the first estimated output and the second estimated output; and
transmitting, by the processor, a control signal to adjust an operation of the device based on the difference.

10. The method of claim 9, wherein the ideal system model comprises a model of the system inclusive of an influence of a plant capacitance of the system without influence of a direct current (DC) external capacitance associated with one or more additional devices added to the system after a determination of the plant capacitance.

11. The method of claim 9, wherein the second estimated output is generated based at least in part on one or more DC external capacitance values of the system.

12. The method of claim 9, wherein receiving, by the processor, the first estimated output based at least in part on the ideal system model comprises:
transmitting, via the processor, the setpoint input to the ideal system model; and
receiving, via the processor, the first estimated output based at least in part on the ideal system model approximating an ideal integrator.

13. The method of claim 9, comprising transmitting, by the processor, an additional control signal to cause a graphical user interface to render the first estimated output via an electronic display.

14. The method of claim 9, wherein the ideal system model comprises a capacitance value set to zero.

15. A tangible, non-transitory, and machine-readable medium, comprising machine-readable instructions stored thereon that when executed cause a processor to perform operations comprising:
receiving a first estimated output of a system in response to a setpoint input, wherein the system performs one or more industrial operations, and wherein the first estimated output is determined based at least in part on an ideal model of the system;
receiving a second estimated output from a non-ideal model of one or more devices within the system in response to the setpoint input, wherein the second estimated output is associated with a non-ideal response of the one or more devices to the setpoint input;

determining a difference between the first estimated output and the second estimated output to subtract out an error between the non-ideal response of the one or more devices to the setpoint input and an ideal response of the system without the non-ideal response of the one or more devices to the setpoint input; and transmitting a control signal to adjust an operation of the system based on the difference.

16. The tangible, non-transitory, and machine-readable medium of claim 15, wherein the ideal model of the system is stored in the tangible, non-transitory, and machine-readable medium.

17. The tangible, non-transitory, and machine-readable medium of claim 16, wherein the setpoint input comprises a target value for an operational parameter of the system.

18. The tangible, non-transitory, and machine-readable medium of claim 15, wherein the instructions for transmitting the control signal to adjust the operation of the system based on the difference are configured to cause the processor to perform operations comprising:

transmitting the control signal to adjust a switching operation of an active front end device in response to the difference.

19. The tangible, non-transitory, and machine-readable medium of claim 15, wherein the second estimated output is determined based on an external capacitance value and a capacitance of the system.

20. The tangible, non-transitory, and machine-readable medium of claim 19, wherein the external capacitance value corresponds to an additional capacitance added to the system after the ideal model of the system is generated.

* * * * *